(12) United States Patent
Lanquist

(10) Patent No.: US 11,518,016 B2
(45) Date of Patent: Dec. 6, 2022

(54) POWER TOOL CONFIGURED TO OPERATE IN LOW-NOISE MODE

(71) Applicant: HUSQVARNA AB, Huskvarna (SE)

(72) Inventor: Pierre Lanquist, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 945 days.

(21) Appl. No.: 16/294,599

(22) Filed: Mar. 6, 2019

(65) Prior Publication Data
US 2019/0275657 A1 Sep. 12, 2019

(30) Foreign Application Priority Data
Mar. 7, 2018 (SE) .................................. 1850245-0

(51) Int. Cl.
*B25F 5/00* (2006.01)
*F16H 59/02* (2006.01)
*A01G 20/47* (2018.01)

(52) U.S. Cl.
CPC ............... *B25F 5/00* (2013.01); *A01G 20/47* (2018.02)

(58) Field of Classification Search
CPC ........... B25F 5/00; A01G 20/47; A01G 3/047; A01G 3/053; A01G 3/062; A01G 3/085; A47L 5/14; B27B 17/00; E01H 1/0809
See application file for complete search history.

(56) References Cited

U.S. PATENT DOCUMENTS

| 5,174,255 | A | * | 12/1992 | Collins | F02M 35/1233 |
| | | | | | 261/64.6 |
| 5,502,869 | A | * | 4/1996 | Smith | A47L 9/0081 |
| | | | | | 381/71.5 |
| 6,158,082 | A | * | 12/2000 | Beckey | A47L 9/0081 |
| | | | | | 181/252 |
| 6,468,053 | B2 | * | 10/2002 | Wolpert | A01G 20/47 |
| | | | | | 415/119 |
| 8,528,217 | B2 | * | 9/2013 | Kondo | B27B 17/00 |
| | | | | | 30/296.1 |
| 9,797,412 | B2 | * | 10/2017 | Le Roy | F04D 29/4226 |
| 2001/0005918 | A1 | * | 7/2001 | Miyamoto | A47L 5/36 |
| | | | | | 15/327.5 |
| 2004/0261386 | A1 | * | 12/2004 | Matsuda | A01D 34/6806 |
| | | | | | 56/10.8 |

(Continued)

FOREIGN PATENT DOCUMENTS

| CN | 102100143 B | 6/2011 |
| CN | 105766403 A | 7/2016 |

(Continued)

OTHER PUBLICATIONS

Swedish Office Action and Search Report for Swedish Application No. 1850245-0 dated Aug. 30, 2018.

*Primary Examiner* — Marc Carlson
(74) *Attorney, Agent, or Firm* — Burr & Forman LLP

(57) ABSTRACT

A power tool comprising a controller for controlling the operation of the power tool wherein the controller is configured to control operation of the power tool in a default mode and in a low-noise mode, wherein;

the controller, is configured to control operation of the power tool in the low-noise mode on basis of predetermined settings that are selected such that the noise output from the power tool in the low-noise mode is lower than the noise output from the power tool in the default mode.

14 Claims, 3 Drawing Sheets

(56) References Cited

U.S. PATENT DOCUMENTS

| | | | | |
|---|---|---|---|---|
| 2007/0247095 | A1* | 10/2007 | Machens | A01D 34/90 |
| | | | | 318/268 |
| 2010/0028134 | A1* | 2/2010 | Slapak | G10K 11/17853 |
| | | | | 415/119 |
| 2011/0200426 | A1* | 8/2011 | Takano | F04D 29/02 |
| | | | | 181/224 |
| 2012/0138322 | A1* | 6/2012 | Neubauer | B24B 27/08 |
| | | | | 173/2 |
| 2014/0049204 | A1* | 2/2014 | Ito | H02P 7/14 |
| | | | | 318/544 |
| 2016/0354905 | A1* | 12/2016 | Ely | B25B 21/008 |
| 2018/0151171 | A1* | 5/2018 | Kwan | G10K 11/178 |
| 2019/0227528 | A1* | 7/2019 | Abbott | G05B 19/4155 |

FOREIGN PATENT DOCUMENTS

| | | | |
|---|---|---|---|
| CN | 107761632 | A | 3/2018 |
| CN | 207410861 | U | 5/2018 |
| EP | 69922083 | T2 * | 3/2005 |
| EP | 2724605 | A1 | 4/2014 |
| JP | 2016-087716 | A | 5/2016 |
| JP | 2016087716 | A * | 5/2016 |

\* cited by examiner

POWER TOOL CONFIGURED TO OPERATE IN LOW-NOISE MODE

This application claims priority to Swedish application number 1850245-0 filed Mar. 7, 2018, the entire contents of which are hereby incorporated by reference it its entirety.

TECHNICAL FIELD

This application relates to a power tool, preferably a garden power tool such as a leaf blower, a trimmer, a hedge trimmer or a chainsaw.

BACKGROUND

In use, motorized garden tools or garden power tools such as leaf blowers, trimmers, hedge trimmers and chainsaws produce noise. For the user of the garden power tool, high levels of noise are disturbing and could also potentially cause impaired hearing. Worker's health legislation in some countries therefore prescribes that persons subjected to noise levels above 85 dB are required to wear hearing protection. Ear protection, such as ear cuffs are typically considered uncomfortable especially during prolonged use. High levels of noise from garden tools is further often experienced as annoying and disturbing to people who reside in the surroundings where the garden power tool is used. In certain areas such as gardens, parks or close to hospitals or residential areas, the use of motorized garden tools may be therefor be restricted.

There is thus an object of the present disclosure to provide an improved power tool, preferably a garden power tool, that solves or at least mitigates at least one of the problems of the prior art.

In detail it is an object of the present disclosure to provide a power tool that allows for use in areas where noise levels are restricted.

Yet a further object of the present disclosure is to provide a power tool which allows for easy limitation of the noise output from the power tool.

The present disclosure further relates to a system for operating one or more power tools and to a method for operation a power tool.

SUMMARY

According to the present disclosure, at least one of the above objects is met by a power tool comprising a controller for controlling the operation of the power tool wherein; the controller is configured to control operation of the power tool in a default mode and in a low-noise mode, wherein the controller, is configured to control operation of the power tool in the low-noise mode on basis of predetermined settings that are selected such that the noise output from the power tool 1 in the low-noise mode is lower than the noise output from the power tool in the default mode.

The noise output from the power tool may thus easily be reduced when it is required. An advantage by having the controller to automatically operate the tool on basis of pre-defined settings to achieve a reduced noise-output from the tool is that any subjectivity regarding the noise output from the power tool is eliminated. This could otherwise be the case when the person using power tool should use his hearing capability or judgement to determine whether the power tool is operated at a performance levels where e.g. local noise requirements are met.

Preferably, the controller is configured to receive low-noise activation input from a low-noise activation means and on basis of low-noise activation input activate a low-noise state of the controller in which the controller controls operation of the power tool in the low-noise mode.

According to one alternative, the low-noise activation input is a signal from a low-noise activation means that is remote from the power tool. This allows a manager of one or several power tools to ensure that the power tools run in low noise mode in a specific moment.

The low-noise activation input may be the time-of-day and/or the date and/or the geographic position of the power tool. It may thereby be ensured that the power tool is operated in low-noise mode during specific times of the day or in specific areas. Thus, it may be ensured that local requirements on noise-output levels are met In an embodiment, the low-noise activation means is an actuator arranged on the power tool and configured to be actuated by a user, wherein the controller is communicatively connected to the actuator and wherein the actuator is configured to transmit low-noise activation input to the controller upon actuation of the actuator. This allows the person using the power tool to easily switch operation of the power tool from default mode to low-noise mode.

The controller may be configured to receive the predetermined settings for operating the power tool in the low-noise mode from a source that is remote to the power tool. This allows a manager of one or more power tools to update the settings of the power tools to meet local requirements from distance. This in turn saves time and ensures that local noise output requirements are met. Alternatively, the controller comprises the predefined settings for operating in the low-noise mode.

Typically, the power tool comprises an electrical motor and wherein the controller is configured to control the operation of the motor. Particular advantages are achieved in implementing the present invention in electrical motors since because very low noise-output levels may be reached electrical motors that run in low-noise mode. For comparison, in internal combustion engines, there is a limit to the lowest noise output level that is possible to reach because internal combustion engines have a noisy idle state.

Preferably, the power tool is a garden tool such as a blower. An advantage may thereby be achieved because blowers, i.e. leaf blowers, generally produce a lot of noise. However, the power tool may alternatively be a trimmer or a hedge trimmer or a chainsaw. The predetermined settings for operating in the low-noise mode may be selected from motor speed and/or motor acceleration and/or motor power and/or lubrication feed. These parameters are easily to control by use of the controller.

The power tool may comprise a low-noise component such as an Active Noise Cancellation unit. Or, in the case of a leaf-blower, an exhaust pipe comprising a layer of sound dampening material or a layer of sound dampening material arranged at the air intake. The use of low-noise components may reduce the sound output from the power tool even further.

The present disclosure also relate to a system for operating one or more a power tools comprising:
- at least one power tool, and;
- a remote device, wherein
- the remote device and the power tool are communicatively connectable and wherein the remote device is configured to transmit low-noise activation input to the controller of the at least one power tool. An advantage of the system is that a manager of a fleet of power tools may control the noise output from all power tools from a distance. The manager of the fleet may thereby ensure that local noise output requirements are met in all power tools of the fleet.

The present disclosure also relates to a method for operating a power tool comprising a motor and controller for controlling the operation of the tool, wherein the controller is configured to control operation of the power tool in a default mode and in a low-noise mode, said method comprising the steps:

receiving low-noise activation input, and;
on basis of the low noise activation input activating a low-noise state of the controller in which the controller controls operation of the power tool in the low-noise mode, and;
operating the controller to control operation of the power tool on basis of predetermined settings that are selected such that the noise output from the power tool in the low-noise mode is lower than the noise output from the power tool in the default mode.

BRIEF DESCRIPTION OF THE DRAWINGS

The invention will be described in further detail under reference to the accompanying drawings in which.

DETAILED DESCRIPTION

The power tool according to the present disclosure will now be described more fully hereinafter. The power tool according to the present disclosure may however be embodied in many different forms and should not be construed as limited to the embodiment set forth herein. Like numbers refer to like elements throughout the disclosure.

Figure 1A:
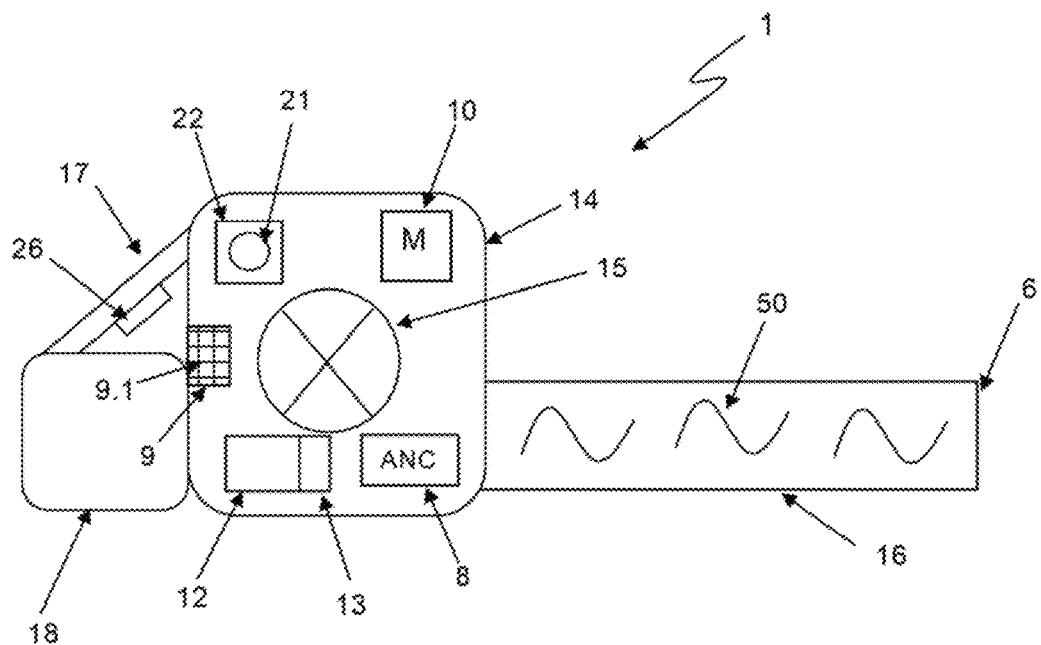
FIG. 1a shows a schematic drawing of a power tool according to an example embodiment of the present disclosure.

FIG. 1a shows a power tool 1 according to a first embodiment of the present disclosure. The power tool 1 of FIG. 1a is a garden power tool, in detail a leaf blower. However, other types of garden power tools are feasible within the present disclosure. For example, the power tool may be a chain-saw or trimmer or a hedge-trimmer. The garden power tool 1 maybe designed for professional or domestic use.

The leaf blower 1 comprises a motor 10 and a fan 15 which is propelled by the motor 10 and configured to produce an airflow 50. The leaf blower 1 further comprises a power source 18 for powering the motor 10 and a controller 12 with a memory 13 for controlling operation of the leaf blower 1.

The leaf blower 1 also comprises a housing 14 which may enclose the fan 15, the motor 10 and the controller 12. The housing 14 further comprises an air intake 9 and an exhaust pipe 16 which is arranged such that the airflow 50 from the fan 15 is led into an exhaust pipe 16 and expelled from an outlet 7 at the end of said exhaust pipe 16. The housing may comprise a handle 17 for allowing a person (not shown) to hold and manoeuvre the leaf blower 1 by hand. The leaf-blower 1 may also comprise a throttle 26 for allowing a user to increase or decrease the speed of the motor of the leaf-blower and thus the air flow 50. Preferably, the motor 10 is an electrical motor and the power source 18 is a battery, for example a rechargeable Li-ion battery.

The memory 13 of the leaf-blower may be configured to carry instructions, such as computer executable instructions, for controlling the leaf blower 1. The controller 12 may be configured to read instructions from the memory 13 and execute these instructions to control the operation of the leaf blower 1. For example controlling the motor 10 of the leaf blower 1. The controller 12 may be implemented using any suitable available processor or Programmable Logic Circuit (PLC). The memory 13 may be implemented using any available technology for computer-readable memories such as ROM, RAM, SRAM, DRAM, FLASH, DDR, SDRAM or other memory technology. Alternatively, the instructions for controlling the leaf blower 1 may be transmitted wire-less to the controller 12 or to the memory 13.

According to the present disclosure, the controller 12 is configured to control operation of the leaf-blower 1 in a default mode and in a low-noise mode. It is appreciated that the default mode and the low-noise mode are two separate operational modes of the leaf blower.

In the default mode, the controller 12 control operation of the leaf-blower on basis of settings that allows the leaf-blower 1 to run at optimal performance. These settings are typically settings that conventionally are used for controlling the operation of a leaf-blower 1. For example, maximum motor speed, maximum motor acceleration and power consumption of the motor and combinations thereof.

In the low-noise mode, the controller 12 controls operation of the leaf-blower 1 on basis of predetermined settings that are selected such that the noise-output from the leaf-blower is less than the noise-output from leaf blower running in default mode. These settings may be determined in practical trials in which the noise-output of the leaf-blower is measured when the leaf-blower is run. In a first trial, the maximum noise-output of the leaf blower 1 may be determined when the leaf blower is run in default mode, for example at maximum motor speed, maximum motor acceleration and power consumption of the motor and combinations thereof. In subsequent trials, the leaf-blower may be run with different motor speeds, different motor accelerations and different power consumptions or combinations thereof. Simultaneous, the performance of the leaf-blower in terms of e.g. air-flow or leaf blowing capacity is determined and the noise-output from the leaf-blower measured. Specific settings or combination of settings that result in acceptable performance of the leaf blower 1 in combination with a low noise-output that are recorded. With "low noise-output" is here meant a noise-output that is less than the noise-output from the leaf-blower when run in default mode. These settings may be stored in the memory 13 and used by the controller 12 for operating the leaf-blower in low-noise mode. Alternatively, the predetermined settings for operating the leaf-blower 1 in low-noise mode may be stored in a memory located in a remote device, such as a server.

The predetermined settings for operating the leaf-blower in low-noise mode are preferably selected such that the noise-output from the leaf-blower is 85 dB or less, preferably 80 dB or less.

Figure 3:
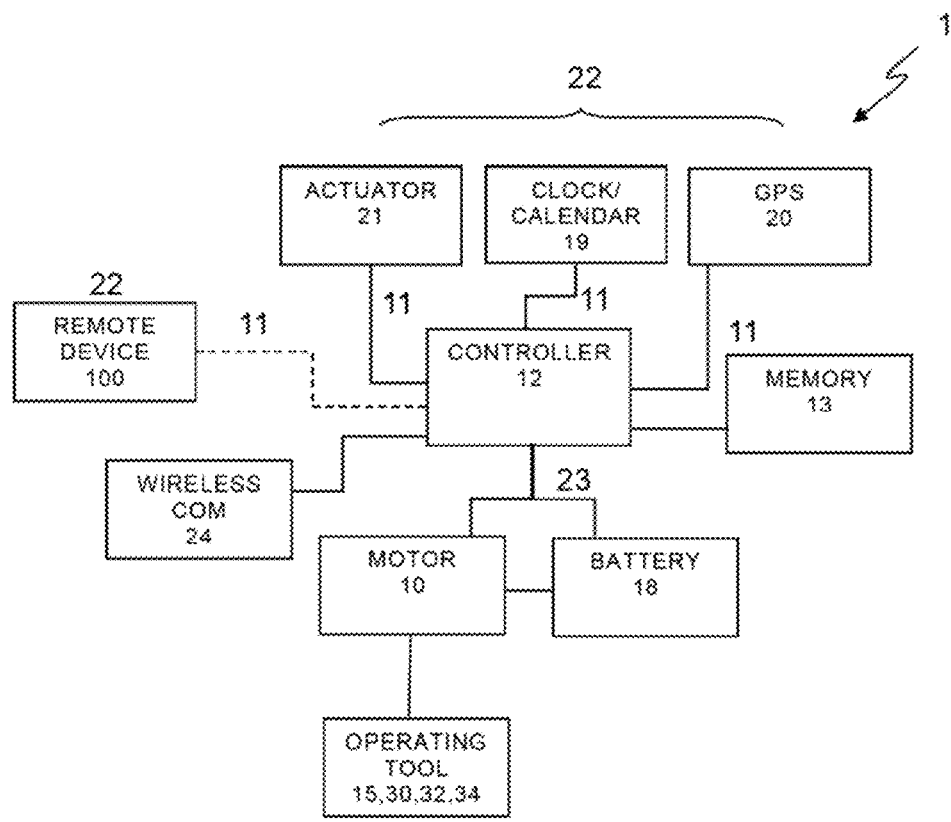
FIG. 3 shows schematically features of a power tool according to the present disclosure.

Turning to FIG. 3, the controller 12 may be configured to receive low-noise activation input 11 from a low noise activation means 22 and on basis of the low-noise activation input activate a low-noise state of the controller 22 in which the controller 22 controls operation of the leaf-blower 1 in low noise mode. Thus, when the controller 12 controls operation of the leaf-blower in low-noise mode, the controller 12 is in a low-noise state. FIG. 3 shows the controller 12, the memory 13 and various low-noise activation means 22 that will be described hereinafter. FIG. 3 also shows schematically the motor 10, the battery 13 and the tool 15 (i.e. the fan) of the leaf blower 1.

According to one alternative, the low-noise activation means 22 may be an actuator 21 that is configured to be manually actuated by a user of the leaf-blower. FIG. 1a shows an actuator 21 in the form of an electrical switch such as a press button or turnable knob that is arranged on the housing 14. The controller 12 is communicatively connected to the actuator 21, for example by electrical wires, and the actuator 21 is configured such that actuation of the actuator 21 transmits low-noise activation input to the controller 12. For example, when the actuator 21 is in the form of an electric switch is closed, an electric current is transmitted as low-noise activation input 11 to the controller 12.

Returning to FIG. 3, the controller 12 may comprise, or be connected, to a low noise activation means in form of a clock 19 which may include a calendar. The clock 19 may transmit low-noise activation input 11 in the form the time-of-day or the date to the controller 12. The controller may thereby be configured to activate the low-noise state at a predetermined time of day or at predetermined dates.

Alternatively or in addition, the controller 12 may comprise or be connected to a GPS receiver 20 for receiving information from Global Positioning Satellites indicative of the geographical position of the leaf-blower 1. The controller 12 may thus receive low-noise activation input 11 from the GPS receiver 20 and activate the low noise state in dependency of the geographic position of the leaf-blower 1.

Figure 2:
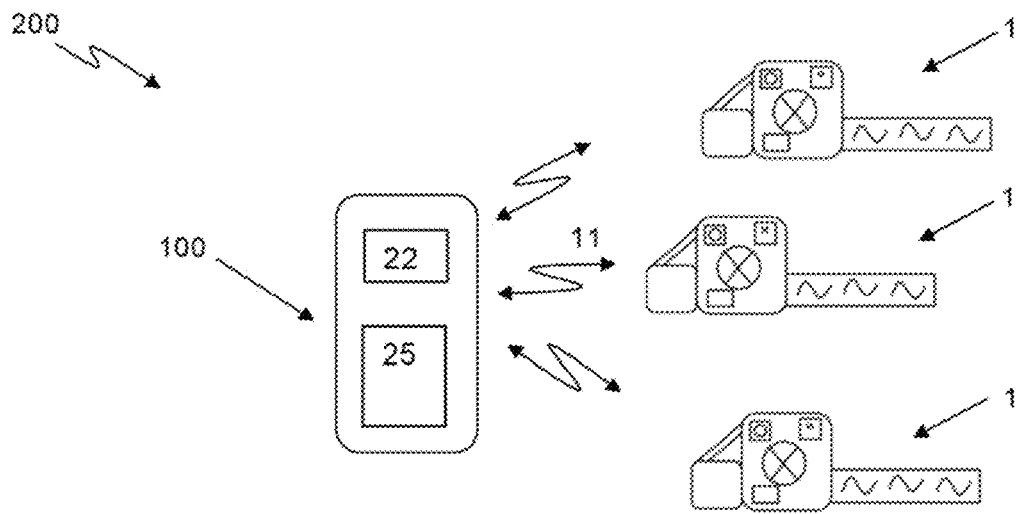
FIG. 2 shows a schematic drawing of a system comprising a power tool according to the present disclosure.

The controller 12 may further be configured to receive low-noise activation input 11 in the form of a signal from a low-noise activation means 22 that is remote from the leaf-blower. The controller 12 may thereby comprise, or be connected to, means 24 for wireless communication such as GSM, WiFi or Bluetooth. FIG. 2 shows a low noise activation means 22 in the form of a remote device 100. The remote device 100 may for example be a cell-phone, a tablet or a server and is also configured for wireless communications based on e.g. GSM or WiFi or Bluetooth. The controller 12 and the low noise activation means 22 are wirelessly communicatively connectable such that low noise activation input 11 transmitted from the remote device 100 may be received by the leaf blower 1. The remote device 100 may further be configured to receive a user command and in response thereto wirelessly transmit low-noise activation input 11 to the leaf blower 1. For receiving the user command, the remote device may comprise a user input means 25, such as a keyboard or a touch sensitive screen.

FIG. 2 further illustrates a further aspect of the present disclosure in the form of a system 200 for controlling one or more power tools 1. Analogue with the above description, the power tool 1 is a leaf blower. However, the power tool may be a power garden power tool such as a chain-saw or trimmer or a hedge-trimmer. In the embodiment shown in FIG. 2, the system 200 comprises three leaf blowers 1, however the system 200 may comprise any number of lead-blowers 1, such as at least one leaf blower, two leaf blowers or more than three leaf blowers. The system 200 further comprises a remote device 100 that is communicatively connectable with the leaf blowers 1 and that is configured to transmit low noise activation input 11 to at least one of the leaf blowers.

Figure 1B:
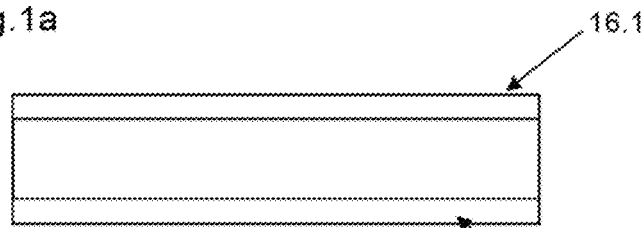
FIG. 1b: shows a schematic drawing of a low-noise component of a power tool according to the present disclosure.

Returning to FIG. 1a, the leaf-blower may comprise low-noise components, i.e. components that are configured to reduce noise from the leaf-blower 1. According to one alternative certain components of the leaf-blower 1 may be replaced with corresponding low-noise components. FIG. 1b shows a low-noise component in the form of a low-noise exhaust pipe 16.1 which may replace the exhaust pipe 16 of the leaf-blower in FIG. 1a. The low-noise exhaust pipe 16.1 comprises a means for noise-dampening in the form of a layer of noise-dampening material 16.2 on the inner surface of the low-noise exhaust pipe 16.1. For example a foam layer with noise dampening characteristics, such as polyurethane foam. The noise-dampening layer 16.2 maybe a single layer or a dual layer which is suitable for dampening both high-frequency and low-frequency noise. FIG. 1a further shows another low-noise component in the form of layer of noise dampening material 9.1 at the air intake 9 of the leaf blower. The leaf blower 1 may further comprise a low-noise component in the form of an Active Noise Cancellation (ANC) unit 8. The ANC-unit 8 comprises a loudspeaker and a microphone and an ANC-circuit (not shown). The microphone is arranged to pick up noise generated by a noise source in the leaf-blower and transmit the noise as sound signal to the ANC-circuit. The ANC-circuit inverts the sound signal and the inverted sound signal is outputted as inverted noise from the loud speaker towards the noise source. Active Noise Cancellation is known in the art and need therefore not to be described further here within. The controller 12 may be configured to automatically activate the ANC-unit 8 in operating in low-noise mode.

Figure 4:
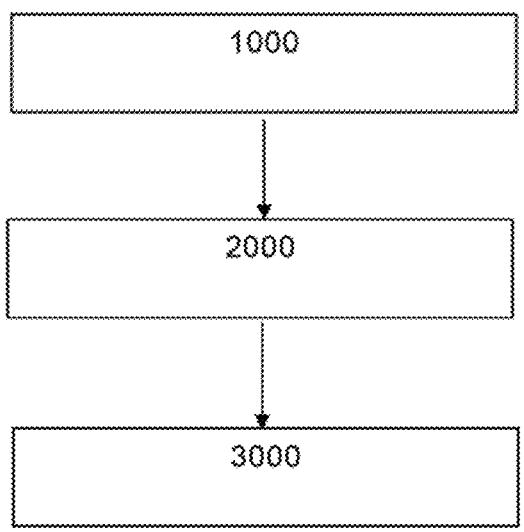
FIG. 4 shows a flowchart of a method for operating a power tool according to the present disclosure.

The present disclosure also relates to a method for operating a power tool 1, such as a leaf-blower described above. The steps of the method are shown in the flowchart of FIG. 4 where the controller 12 receives [1000] low-noise activation input 11 and on basis of the low noise activation input 11 activates [2000] a low-noise state of the operation of the controller 12 in which the controller 12 controls operation of the power tool 1 in the low-noise mode, and operate [3000] the controller 12 to control operation of the power tool 1 on basis of predetermined settings that are selected such that the noise output from the power tool 1 in the low-noise mode is lower than the noise output from the power tool 1 in the default mode is below a predefined noise level.

In the following are other types of power tools according to the present disclosure described.

Figure 5:
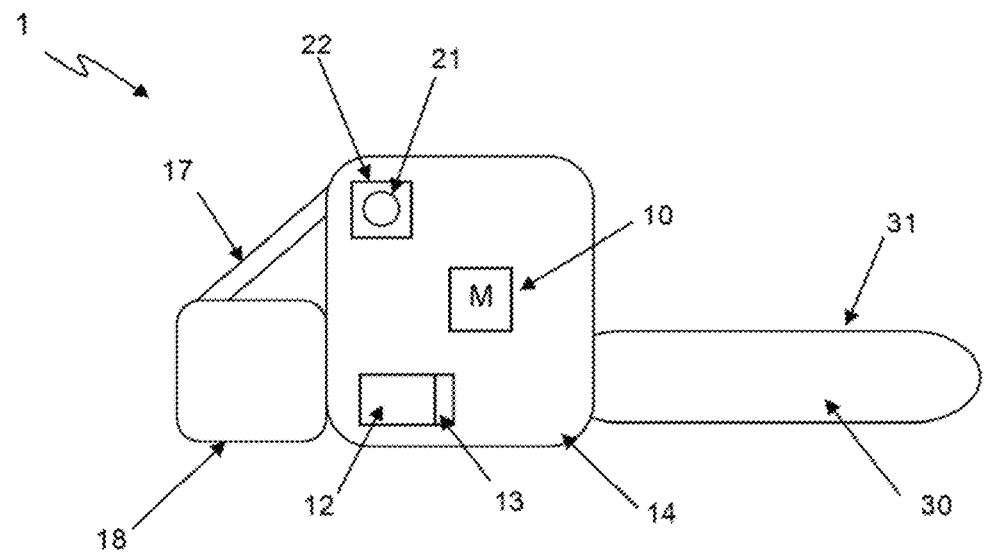
FIG. 5-7 shows embodiments of the power tool according to the present disclosure.

FIG. 5 shows a power tool 1 in the form of a chain saw. The chain saw 1 comprises a sawblade 30 including a saw chain 31. A housing 14 encloses an electric motor 10 for propelling the saw chain 31. A battery 18 provides power to the motor 10 and a handle 17 is provided for the user of the chain saw. The chain saw 1 further comprises a controller 12 and a memory 13, which are configured as described hereinabove but adapted to control the operation of the chain saw in a default mode and in a low-noise mode. The chain-saw may comprise a low-noise component (not shown) in form of a saw chain that is configured for low-noise output.

Figure 6:
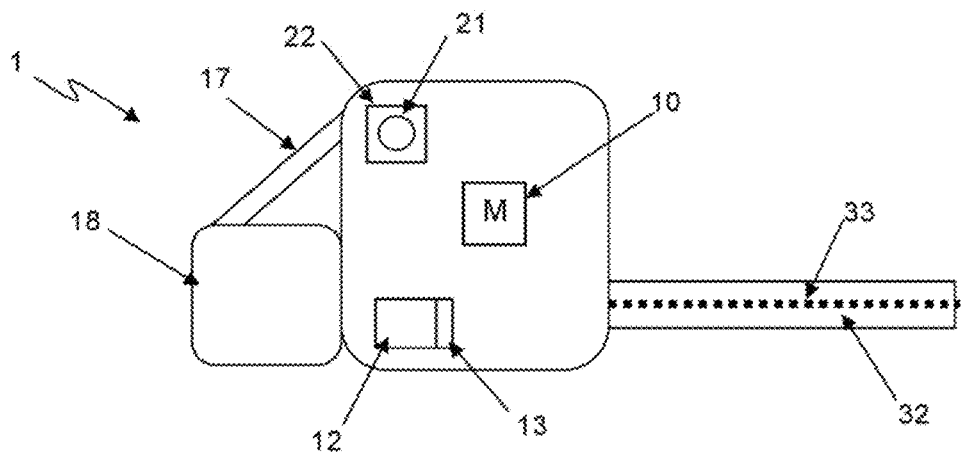

FIG. 6 shows a power tool 1 in the form of a hedge-trimmer 1. The hedge-trimmer 1 comprises a sawblade 32 with reciprocating teeth 33. A housing 14 encloses an electric motor 10 for propelling the reciprocating teeth 33. A battery 18 provides power to the motor 10 and a handle 17 is provided for the user of the hedge-trimmer 1. The hedge trimmer 1 further comprises a controller 12 and a memory 13 which are configured as described hereinabove but adapted to control the operation of hedge-trimmer in a default mode and in a low-noise mode.

Figure 7:
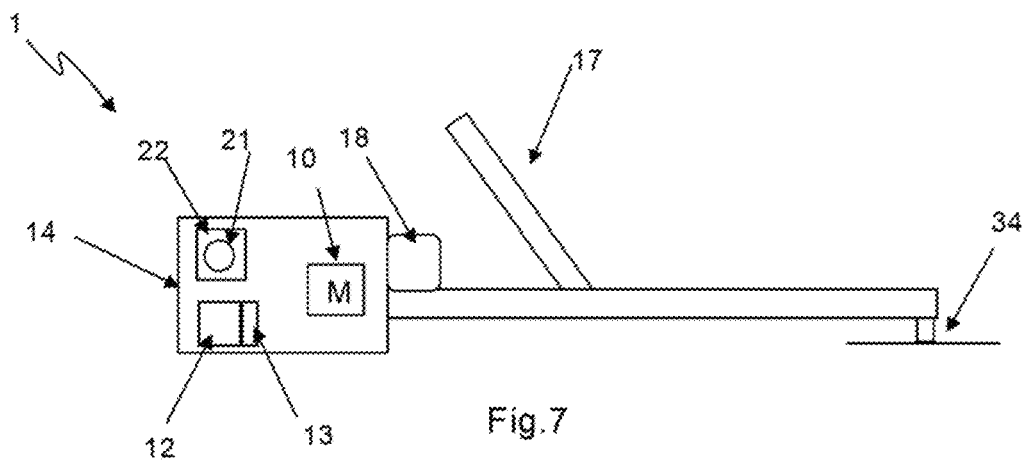

FIG. 7 shows a power tool 1 in the form of trimmer 1, i.e. a clearing trimmer. The trimmer 1 comprises a rotating circular sawblade 34, or alternatively a rotating trimmer wire. A housing 14 encloses an electric motor 10 for propelling the sawblade/trimmer wire. A battery 18 provides power to the motor 10 and a handle 17 is provided for the user of the trimmer. The trimmer 1 further comprises a controller 12 and a memory 13 which are configured as described hereinabove but adapted to control the operation of a trimmer in a default mode and in a low-noise mode. The trimmer may comprise a low noise component (not shown) in the form a sawblade/trimmer wire that is configured from low noise output.

The chain-saw, the hedge-trimmer and the trimmer may respectively be provided with a low noise component in the form an ANC-unit.

The settings for operating the chain saw, the hedge trimmer and the clearing trimmer in low-noise mode may be determined by practical trials in analogous with the trials described for the leaf-blower.

Analogously with the above the description the present disclosure is also applicable to a power tool that may be operated in dependency of various working conditions. For example, a user of a leaf-blower may encounter various working conditions such as dry working conditions (i.e. dry leaves), or wet working conditions (i.e. wet leaves). It may be difficult for an inexperienced user to correctly operate the leaf blower in different working conditions. The power tool 1 may thereby comprising a controller 12 for controlling the operation of the power tool 1. The controller 12 is configured to control operation of the power tool 1 in a default operation mode and in at least one working condition dependent operation mode, wherein the controller 12, is configured to control operation of the power tool 1 in the working condition dependent operation mode on basis of predetermined settings. Thus, optimized settings for operating the a leaf blower in e.g. dry working conditions may be stored in memory and the controller may, in response to activation input, be configured to activate a dry working condition state in which the controller controls operation of the leaf blower in a dry working condition dependent operation mode.

Apart from dry working condition dependent operation mode, the controller may be configured to control operation of the leaf blower in a wet working condition dependent operation mode or in boost condition working mode (i.e. when a strong breath of air is needed). Settings for the various working modes may be determined from practical trials.

Analogously, the power tool may be a trimmer, such as clearing trimmer, and the various working conditions may be trimming light vegetation or trimming tough vegetation or trimming grass or using saw blade or trimmer wire.

Analogously, the power tool may be hedge trimmer and the various working conditions may be trimming light vegetation or trimming tough vegetation.

Analogously, the power tool may be a chain saw and the various working conditions may be cutting hardwood or cutting soft wood or pruning or carpentering or carving. The working conditions may also include the use of a chain or the use of a carving bar.

The invention claimed is:

1. A power tool comprising a controller for controlling the operation of the power tool, wherein the controller is configured to control operation of the power tool in a default mode and in a low-noise mode, wherein; the controller, is configured to control operation of the power tool in the low-noise mode on basis of predetermined settings that are selected such that the noise output from the power tool in the low-noise mode is lower than the noise output from the power tool in the default mode, wherein the controller is configured to receive low-noise activation input from a low-noise activation means and on basis of the low-noise activation input activate a low-noise state of the controller in which the controller controls operation of the power tool in the low-noise mode, wherein the low-noise activation input is the time-of-day and/or the date and/or the geographic position of the power tool.

2. The power tool according to claim 1 wherein the low-noise activation input is a signal from a low-noise activation means that is remote from the power tool.

3. The power tool according to claim 1, wherein the controller is configured to receive the predetermined settings for operating the power tool in the low-noise mode from a source that is remote to the power tool.

4. The power tool according to claim 1, wherein the controller comprises the predefined settings for operating in the low-noise mode.

5. The power tool according to claim 1, wherein the power tool comprises a motor and wherein the controller is configured to control the operation of the motor.

6. The power tool according to claim 5, the wherein motor is an electrical motor.

7. The power tool according to claim 1, wherein the power tool is a garden tool such as a blower or a trimmer or a hedge trimmer or a chainsaw.

8. The power tool according to claim 1, wherein the predetermined settings for operating in the low-noise mode are selected from motor speed and/or motor acceleration and/or motor power and/or lubrication feed.

9. The power tool according to claim 1, comprising a low-noise component.

10. The power tool according to claim 9, wherein the low-noise component is an Active Noise Cancellation unit.

11. The power tool according to claim 9, wherein the power-tool is a leaf-blower and wherein the low-noise component is an exhaust pipe comprising a layer of sound dampening material.

12. The power tool according to claim 9, wherein the power-tool is a leaf-blower and wherein the low-noise component is a layer of sound dampening material arranged at an air intake of the leaf blower.

13. A system for operating a power tool comprising:
at least one power tool according to claim 1, and;
a remote device, wherein
the remote device and the power tool are communicatively connectable and wherein the remote device is configured to transmit low-noise activation input to the controller of the at least one power tool.

14. A method for operating a power tool comprising a motor and controller for controlling the operation of the tool, wherein the controller is configured to control operation of the power tool in a default mode and in a low-noise mode, said method comprising the steps:
receiving low-noise activation input from a low-noise activation means and on basis of the low-noise activation input activate a low-noise state of the controller, wherein the low-noise activation input is the time-of-day and/or the date and/or the geographic position of the power tool and;

on basis of the low noise activation input activating a low-noise state of the controller in which the controller controls operation of the power tool in the low-noise mode, and;

operating the controller to control operation of the power tool on basis of predetermined settings that are selected such that the noise output from the power tool in the low-noise mode is lower than the noise output from the power tool in the default mode.

* * * * *